(12) United States Patent
Kousek et al.

(10) Patent No.: US 6,493,952 B1
(45) Date of Patent: Dec. 17, 2002

(54) MEASURING DEVICE SUBJECTED TO GRAVITATIONAL FORCES AND HAVING A PENDULOUS SUSPENSION

(75) Inventors: Heinz Kousek, Feldkirch (AT); Reinhard Waibel, Berneck (CH); Wilfried Piske, Heerbrugg (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/265,472

(22) Filed: Mar. 10, 1999

(30) Foreign Application Priority Data

Mar. 11, 1998 (DE) ......................... 198 10 447

(51) Int. Cl.$^7$ ..................... G01C 15/00; G01C 9/12
(52) U.S. Cl. ..................... 33/286; 33/291; 33/DIG. 21; 356/250; 356/149; 73/514.23; 73/514.87
(58) Field of Search ...................... 33/227, 276, 281, 33/282, 283, 285, 286, 290, 291, 354, 391, 392, 402, DIG. 1, DIG. 21; 356/250, 149; 73/514.23, 514.37

(56) References Cited

U.S. PATENT DOCUMENTS

| | | | |
|---|---|---|---|
| 4,302,885 A | 12/1981 | Levin et al. | 33/228 |
| 4,649,748 A * | 3/1987 | Fukano et al. | 73/514.23 |
| 4,748,848 A * | 6/1988 | Scholl et al. | 73/514.23 |
| 4,949,089 A | 8/1990 | Ruszkowski, Jr. | 342/52 |
| 5,165,279 A * | 11/1992 | Norling et al. | 73/514.37 |
| 5,287,627 A | 2/1994 | Rando | |
| 5,313,409 A | 5/1994 | Wiklubd et al. | 364/556 |
| 5,459,932 A * | 10/1995 | Rando et al. | 33/291 |
| 5,471,218 A | 11/1995 | Talbet et al. | 342/357 |
| 5,524,352 A * | 6/1996 | Rando et al. | 33/291 |
| 5,574,552 A | 11/1996 | Dunne | 356/5.05 |
| 5,612,779 A | 3/1997 | Dunne | 356/5.01 |
| 5,617,202 A * | 4/1997 | Rando | 33/286 |
| 5,644,083 A * | 7/1997 | Newell et al. | 73/514.37 |
| 5,644,086 A * | 7/1997 | Cahill et al. | 73/514.37 |
| 5,652,651 A | 7/1997 | Dunne | 356/5.01 |
| 5,680,208 A * | 10/1997 | Butler et al. | 33/283 |
| 5,739,785 A | 4/1998 | Allison et al. | 342/357 |
| 5,790,248 A * | 8/1998 | Ammann | 33/283 |
| 5,914,778 A * | 6/1999 | Dong | 33/291 |
| 6,035,540 A * | 3/2000 | Wu et al. | 33/286 |
| 6,195,901 B1 * | 3/2001 | Falb | 33/286 |

FOREIGN PATENT DOCUMENTS

| | | |
|---|---|---|
| JP | 9178632 | 10/1984 |
| JP | 2118413 | 5/1990 |
| WO | 9207290 | 4/1992 |

OTHER PUBLICATIONS

Criterion Series Advertisement, Hand Held Survey Lasers, Laser Technology, Inc., Englewood, CO, published on or before Dec. 5, 1997.
Impulse and Impulse XL Advertisements, Laser Technology, Inc., Englewood, CO, published on or before Dec. 5, 1997.
SharpShot 2000 Advertisement, Laser Technology, Inc. Englewood, CO, published on or before Dec. 5, 1997.
Generation II Surveyor Advertisement, MDL Technologies LLC., Professional Surveyor, Apr. 1997, vol. 17, No. 3.

* cited by examiner

Primary Examiner—Diego Gutierrez
Assistant Examiner—Madeline Gonzalez
(74) Attorney, Agent, or Firm—Sidley Austin Brown & Wood, LLP

(57) ABSTRACT

A measuring device (6) subjected to gravitational forces and including at least one laterally oscillating, pendulously suspended, support structure (7) for supporting at least one of a measuring element, and optical element, and a suspension element for suspending the support structure and including at least one hinge formed as a tape hinge (21; 40).

6 Claims, 2 Drawing Sheets

MEASURING DEVICE SUBJECTED TO GRAVITATIONAL FORCES AND HAVING A PENDULOUS SUSPENSION

BACKGROUND OF THE INVENTION

1. Field of the Invention

The present invention relates to a measuring device subjected to gravitational forces and including at least one laterally oscillating, pendulously suspended support structure for supporting, e.g., an optical device. In particular, the present invention relates to a suspension for such a device.

2. Description of the Prior Art

In many scientific and technical applications, the gravity force acting on a measuring system plays not inconsiderable role. In many cases, the action of the gravity force is used directly or indirectly for solving a measurement problem Inclinometer, horizon sensor, accelerometer, leveling devices are examples of measuring devices influenced by gravitational forces. In particular, it is often necessary to precisely align horizontally and/or vertically a measuring device, a display device, an optical device and the like. In particular, optical devices for projection of marks over large distances put high demands to a leveling device in order to keep a projection error over a large distance as small as possible. For some time, in constructional industry and in building technology, apparatuses, which contain optical devices for transmitting marks over large distances, e.g., with a light beam, in particular, with a laser beam, are used. With the help of an optical device, which is contained in an apparatus, a laser beam is splitted, e.g., in two or three laser beam components extending, respectively, perpendicular to each other. With such an optical device, an apparatus for displaying right angles and for laying out horizontally and/or vertically extending marks can be formed.

The prior art discloses different solutions for aligning a laser beam manually or automatically in order to insure an exact horizontal and/or vertical course of a laser beam in case of uneven surfaces. One of the known solution consists in that a support plate for a light source and an optical device, which is arranged in the housing of an apparatus, is manually adjusted horizontally and/or vertically in a desired manner with set screws and level indicators, e.g., bubble or water levels. This solution is constructively relatively expensive. Besides, manual adjustment is laborious and often cannot be effected with a desired precision. The adjustment can be simplified and a high adjustment precision can be achieved by the automatization of the adjustment process, e.g., by providing servomotors connected with the level indicator. However, this solution is associated with relatively high costs, connected with the provision of necessary mechanical and electronic means, and increases the overall cost of the measuring apparatus. In addition, leveling devices equipped with servomotors require a relatively large mounting space and, therefore, are used primarily with large precision apparatuses, e.g., with rotating constructional lasers.

U.S. Pat. No. 5,459,932 discloses a laser indicator which emits at least two mutually perpendicular laser beam. The disclosed indicator is used for transmission of horizontal and/or vertical marks or right angles. With this apparatus, e.g., components can be exactly aligned and controlled horizontally and vertically or arranged at a right angle. The apparatus has relatively small dimensions. The action of the leveling device for horizontal and/or vertical alignment of the laser beams is based on the use of gravitational forces. To this end, the light source and the optical device are arranged on a platform which is attached, in a pendulum-like manner, to a wire suspended from the apparatus housing. The pendulously suspended platform has two lateral degrees of freedom and, thereby, can by itself compensate unevenness of the support surface of the apparatus due to action of the gravitational forces. Damping of the pendulously suspended platform is effected, e.g., with a magnetic means. To this end, magnetized elements arranged on the platform cooperate with magnets arranged in the apparatus housing in the vicinity of the platform. To prevent breaking of a relatively brittle wire suspension under impact loads, at least one spring element is provided between a point, at which the wire is attached to the housing, and a point at which it is connected with the platform. The spring element, e.g., a coil spring, damps all of the impacts applied to the housing and reduces the danger of the wire suspension being broken. The spring element can be seriously connected with the wire suspension but also can be used instead of the wire suspension. For power supply, there are provided thin conducting wires which connect a power source arranged in the housing with the light source. The conducting wires have a relatively small mass and are arranged in such a way that their influence on the pendulously suspended platform is minimal. Nevertheless, the stiffness of the wire suspension and the mass of the conducting wires create a torque which prevents an exact horizontal and/or vertical alignment of the platform. The insignificant position errors are compensated with optical means.

Accordingly, an object of the present invention is to improve the apparatus or device described in the above-mentioned U.S. Patent so that the susceptibility of the pendulously suspended platform to impacts is further reduced. A further object of the present invention to prevent, to a most possible extent, interfering oscillation mods such as particularly occurring in wire suspensions. The pendulous suspension of a platform, which supports the light source of the laser and the optical device, should be modified so that preconditions for reducing the influence of the torque of the conducting wires on the pendulous suspension are created. The modified pendulous suspension should be capable of being produced in a simple and cost-effective manner.

SUMMARY OF THE INVENTION

These and other objects of the present invention, which will become apparent hereinafter, are achieved by providing a measuring device subjected to gravitionaly forces and including at least one laterally oscillating, pendulously suspended, support structure for supporting at least one of measuring means and optical means, and means for suspending the support structure and including at least one hinge formed as a tape hinge. Tape hinges have, as a result of their lateral tensioning under the action of impact loads, a greater rigidity than a springy pendulous wire or thread suspension a cross-section of which approximates a point. By forming the hinge as a tape hinge, a bendable region is formed in the hinge which is characterized by a fixed laterally extending neutral axis in a narrow predetermined longitudinal region of the hinge. Further, with regard to available materials, a greater selection of material exists for tape hinges than is the case with wire or thread suspensions. Tape hinges despite their relatively greater rigidity, have a high flexibility and a small base stiffness.

During manufacturing of the tape hinge, the oscillation damping aspect is taken care of to a certain degree by the geometrical design of the hinge section. Thereby, additional damping means, e.g., magnetic means, can be reduced in size. The technology for producing the tape hinges is cost-effective and has proved itself. The articulation region of the suspension can be prefabricated with a reproducible stiffness and need not be first formed during the mounting, as is the case with suspension wires, which may result, dependant on the quality of the mounting, in that the hinge stiffness would differ from hinge to hinge. Because the hinge link is prefabricated, it can be easily mounted in the device.

In particular, tape hinges are suitable for a completely automatic mounting, which further reduces manufacturing and assembly costs of a device equipped with a leveling device according to the present invention.

The suspension can, e.g., include a rubber-like material at least in the articulation region. According to a preferred embodiment of the present invention, which is particularly adapted for a mass production of the suspension, the tape hinge includes plastics or a material compound, in particular, a plastic compound with rubber characteristics. E.g., as a plastic material, polymers such as polyolefine, polypropylene, polyvinyl compounds, or products of polycondensation, such as, e.g., polyamide, and/or their co-polymers can be used. In the articulation region, a tape hinge, which is formed of a thermoplastic material or a material compound with rubber characteristics, has a wall thickness from about 5 $\mu$mm to about 400 $\mu$m. The longitudinal extent of the articulation region of such tape hinges is smaller than 3 mm.

While a tape hinge can, e.g., be produced as a one-piece part by injection-molding, there is also exists a possibility to form the hinge of several parts. In this case, the hinge has a band-like section and two sections surrounding the band-like section at its opposite ends and having a greater thickness than a thickness of the band-like section. The surrounding sections can be formed of the same material as the band-like section or of a different material. The two surrounding sections serve as suspension or connection regions.

In an advantageous embodiment of the present invention, the tape hinge is provided with conducting wires which serve for supplying power to components supported on the pendulously suspended platform and/or serve as signal lines. Because the power lines or signal lines are connected with the hinge, preferably, are integrated therein, separate conducting wires, the moment of which can influence the leveling function, are eliminated. The advantage of this consists in that expensive compensation means, which is required, e.g., in case of optical devices, can be dispensed with.

It is advantageous when the suspension includes two seriesly connected tape hinges the articulation regions of which are pivoted relative to each by 90°. In this embodiment of the inventive suspension, the tape hinges are connected with each other in a manner of a universal coupling, and the seriesly connected tape hinges cover both lateral swinging possibilities. Both hinges can be formed as identical separate hinges connected with each other and pivoted relative to each other by 90°. According to a further embodiment of the invention, both hinges can be formed as a one-piece part.

According to a further embodiment of the invention, the suspension includes at least two seriesly connected frame structures hingedly connected with each other by at least one tape hinge. The frame structures can be reliably secured in the housing and provide a relative large surface for connection with the support structure, i.e., the platform. They have a vertical orientation and provide sufficient space for measuring and optical means arrangeable on the pendulously suspended platform.

For effecting a cardanic suspension, there are provided three seriesly connected frame structures, with each two adjacent frame structures being connected with each other by tape hinges. The hinged connection of the first and second frame structures is pivoted relative to the hinged connection of the second and third frame structures by 90°. The hingedly connected frame structures are advantageously formed as a one-piece plastic part which, advantageously, is produced by injection-molding.

The suspension according to the present invention for use in a measuring device subjected to gravitational forces can have many applications where a gravitational force influences the measurement. It is particularly suitable for a leveling devices based on the use of a gravitational force for aligning the device or its measuring system precisely in a desired direction circumferentially. The inventive suspension is particularly suitable for apparatuses the leveling device of which is formed for horizontal and/or vertical alignment of a light source arranged on a pendulously suspended platform on which, if necessary, an optical beam splitter connected with the light source can be arranged. It is particularly suitable for multi-axes laser indicator devices which emit at least two mutually perpendicular laser beams and are used, e.g., for marking and controlling of exact horizontal and/or vertical alignment of constructional parts and for display of right angles.

BRIEF DESCRIPTION OF THE DRAWINGS

The features and objects of the present invention will become more apparent, and the invention itself will be the best understood from the following detailed description for the preferred embodiments when read with reference to the accompanying drawings. The drawings show a pendulous suspension of optical components of a multi-axis laser indicator device representing an example of a suspension according to the present invention of a measuring device subjected to action of gravitational forces. In the drawings, only the elements necessary for understanding of the present invention are shown. In order to show more clearly relevant aspects of the present invention, the elements of the device are not shown true to the scale. The drawings show.

DETAILED DESCRIPTION OF THE PREFERRED EMBODIMENT

Figure 1:
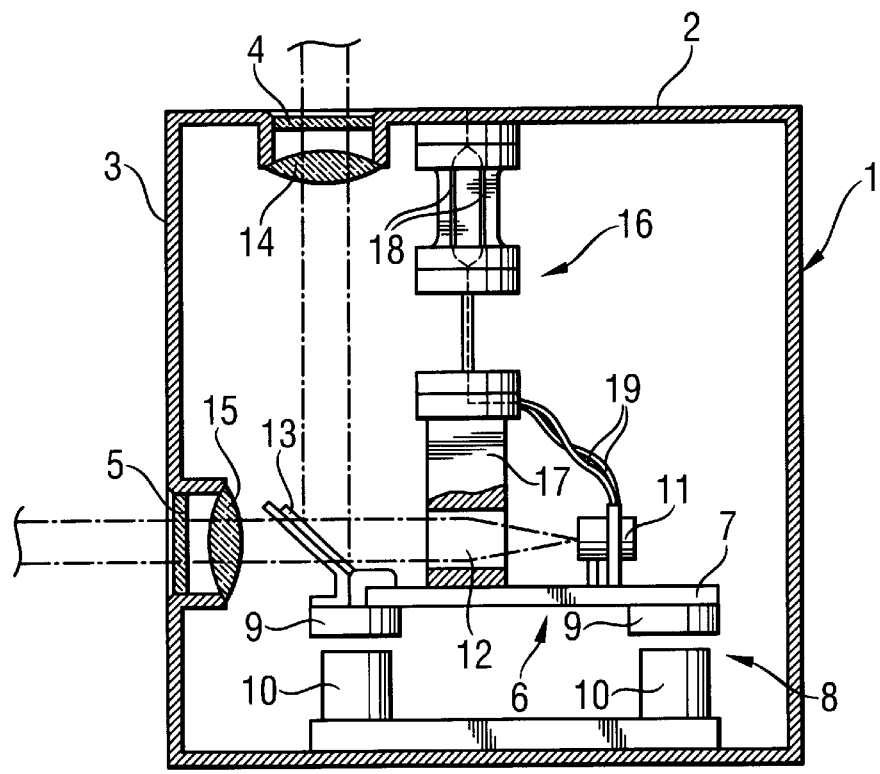
FIG. 1 a cross-sectional view illustrating the interior of a housing of a multi-axis laser indicator device with a suspension according to the present invention.

FIG. 1 shows an open housing 1 of a multi-axis laser indicator device. Two light beam holes 4 and 5 for two laser beams propagating in mutually perpendicular directions are provided in the housing 1.

One of the light beam holes, the hole 4, is provided in a cover 2 of the housing 1, and another of the light beam holes, the hole 5, is provided in a side wall 3 of the housing 1. The laster beams are emitted from a light source 11, usually a laser diode, the light beam of the which, after passing a collimation optics 12, is splitted by a beam splitter 13 in a desired number of laser beam components. Lenses 14 and 15, which are provided, respectively, in front of the beam holes 4 and 5, serve for correcting of possible divergence of the beam components. The laser diode 11, the collimation optics 12, and the beam splitter 13 are arranged on a leveling device 6. The leveling device 6 is formed by a platform 7 which is freely pendulously suspended from the cover 2 of the housing 1. A connection strut 17 connects the platform 7 with a suspension 16 having two, pivoted relatively to each other by 90°, articulation regions. The leveling device 6, which is freely pendulously suspended in the housing 1, serves for leveling unevenness of a control surface. A damping device 8 insures braking of the pendulum movement of the leveling device 6 and prevents oscillation of the emitted laser beam about its predetermined position. The damping device 8 includes, e.g., magnetizable elements 9, which are provided on the bottom surface of the platform 7 and which cooperate with permanent magnets 10 provided on the bottom of the housing 1.

An energy source, not shown, usually a battery or an accumulator, supplies power to the laser diode 11. To this end, as shown in FIG. 1, conducting paths or conducting wires 18 are integrated in the suspension 16. The integrated conducting paths or conducting wires 18 are connected with the energy source in the cover region of the housing 1. In the connection region of the suspension 16 with the connection strut 17 of the platform 7, the conducting paths or wires 18 are connected with leads 19 extending to the laser diode 11. the conducting paths or wires 18, which are integrated in the suspension 16 are separated from each other, and their moment influence can affect leveling. The leads 19 extending form the conducting paths toward the laser diode 11 form an integral component of the leveling device 6 and do not influence in any way the pendulum movement during leveling induced by the gravitational forces.

Figure 2:
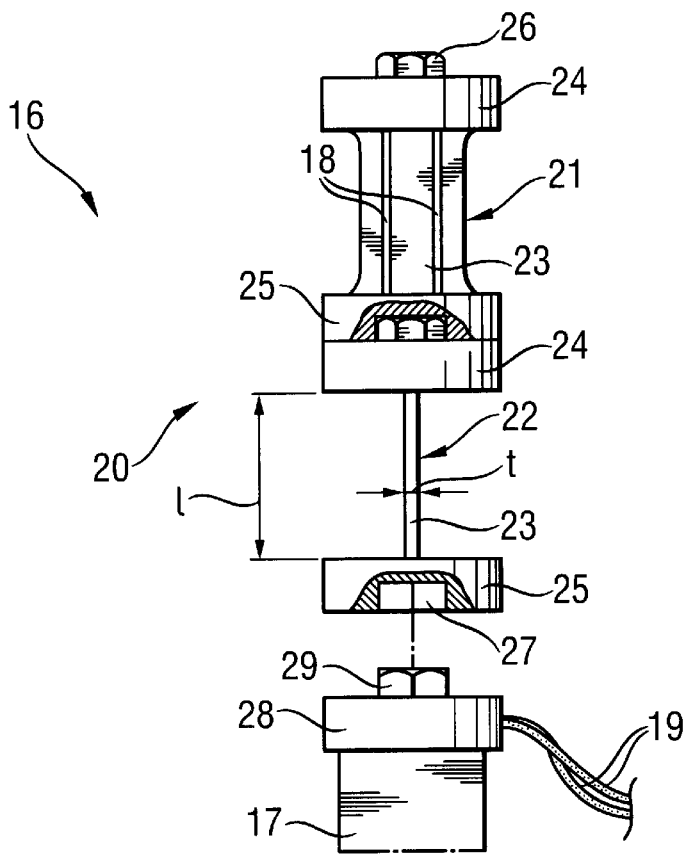
FIG. 2 a schematic view showing, at an increased scale, suspension of a leveling device shown in FIG. 1.

FIG. 2 shows the suspension 16 at an increased scale. As can be seen in FIG. 2, the suspension 16 is formed as a cardanic suspension 21 which is formed of two tape hinges, e.g., film hinges 21, 22. The two film hinges 21, 22 have each an articulation region 23. The articulation regions 23 of the two film hinges 21, 22 are pivoted relative to each other by 90°. In the articulation region 23, the film hinges 21, 22 have a wall thickness to which amounts from 5 $\mu$m to about 400 $\mu$m. The longitudinal extent 1 of the articulation region 23 is smaller than 3 mm. It should be clear that the articulation region 23 should always have a longitudinal extent different from zero. Even when the articulation region is formed as a somewhat V-shaped indentation in a band-like material, the knuckle would have, in the articulation region, a laterally extending neutral axis having a cross-section greater than zero.

Above and below the articulation region 23, end regions 24, 25 are provided. The end regions 24, 25 are provided with coupling elements, e.g., a connection stub 26 and an insertion opening 27. A cardanic suspension with two articulated regions, which are pivoted relative to each other by 90°, can be formed as one-piece element, e.g., by an injection-molding process. In the embodiment shown in the drawings, the suspension is formed of several parts and includes two identically formed tape hinges, which are pivoted relative to each other by 90° and connected with each other by connection elements, the connection stub 26 and the insertion opening 27. As it has already been mentioned above, the tape or film hinges 21, 22 can be formed by an injection-molding process. The connection stub 26 of the upper end region 24 of the upper pivot joint 21 serves for attaching the suspension 16 to the housing cover 2 which, to this end, is provided with a corresponding opening (not shown). The insertion opening 27, which is formed in the lower end region 2.5 of the lower hinge 22 serves for receiving a connection stub 29 which projects from a connection member 29 on the strut 17.

As can be seen in FIG. 2, the conducting paths or wires 18 are integrated into the tape or film hinges 21, 22. Because the conducting wires 18 also extend in the connection regions of the two hinges 21, 22 (in the connection stubs 26 and in the insertion openings 27), an electrical connection is formed upon the connection of the separate hinges 21, 22. Upon the insertion of the connection stub 26 of the upper end region 24 of the upper hinge 21 into the corresponding insertion opening in the cover 2, an electrical connection with an energy source is provided. The leads 19 provide for feeding power to the laser diode 11. To this end, the connection stub 29 is provided with contact points which insure an electrical connection of the leads 19 with the conducting wires 18 upon insertion of the connection stub 29 into the opening 27 in the lower end region 25 of the lower hinge 22. The connections of the leads 29 with the contact points of the connection stub 29 are embedded in the connection member 28 and need not be shown in detail.

Figure 3:
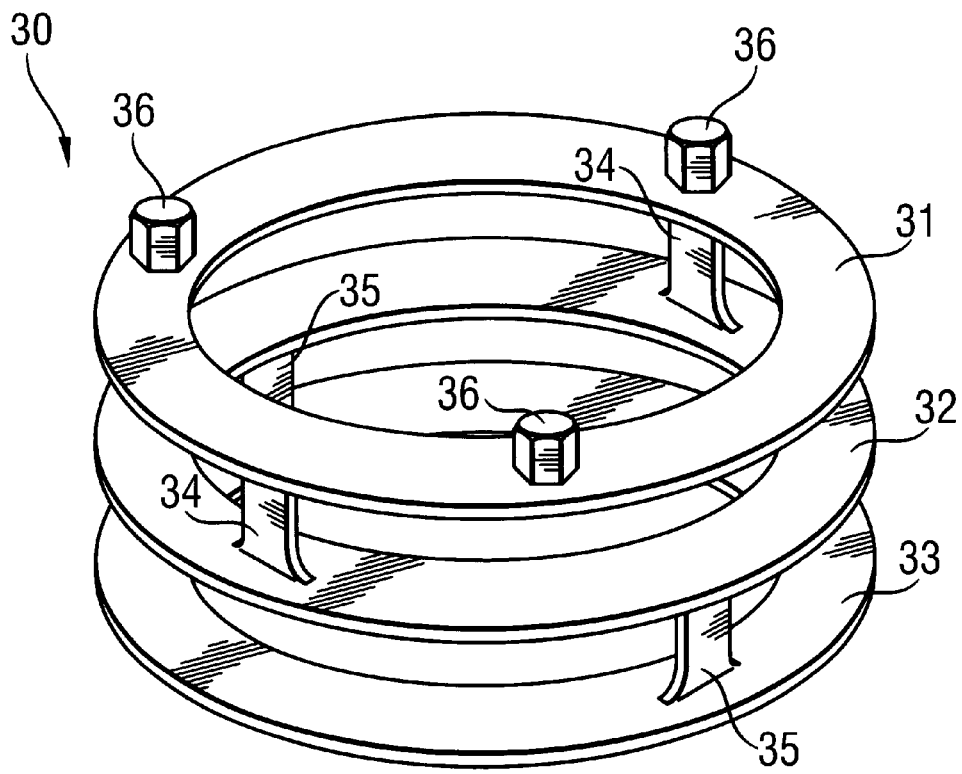
FIG. 3 shows a perspective view of another embodiment of a cardanic suspension.

FIG. 3 shows another embodiment of a cardanic suspension according to the present invention. The suspension 30 shown in FIG. 3 includes three ring-shaped frame structures 31, 32 and 33. Each two adjacent structures 31, 32 and/or 32, 33 are hingedly connected with each other by tape hinges 34, 35, respectively. The arrangement of the tape hinges 34, 35 is so selected that their articulation regions are pivoted relative to each other by 90°. Connection stubs 36 project from an upper surface of the uppermost structure 31. The connection stubs 36 are received in corresponding insertion openings formed in the cover of the housing. The bottom surface of the lowermost structure is provided with connection elements, not shown in detail, which are connectable with corresponding connecting mating elements provided in the connection member of the connection strut of the leveling platform. E.g., the connection elements on the bottom surface of the lowermost structure 33 can likewise be formed as projecting connection stubs which are received in corresponding insertion openings in the connection member of the platform connection strut. Functionally, the cardanic suspension 30 corresponds to the suspension 16 shown in FIGS. 1 and 2.

Figure 4:
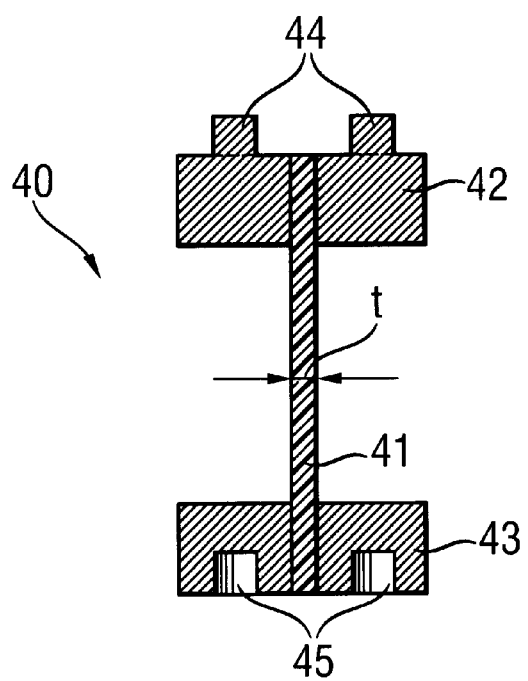
FIG. 4 a schematic view of the suspension with a simple tape hinge.

FIG. 4 shows a separate tape hinge designated generally with a reference numeral 40. The tape hinge 40 is formed of several parts and has a band-like section 41 provided at its opposite ends with similar or different material sections 42 and/or 43. The band-like section 41 has a thickness t which amounts from about 5 $\mu$m to about 400 $\mu$m and forms the articulation region of the hinge. The length of the articulation region, with the hinge being formed of a thermoplastic rigid band with rubber-like characteristics, is usually less than 3 mm. In case the band-like section 41 is formed of a rubber band, the length of the articulation region can be made larger and can amount, e.g., up to 8 mm. The sections 42 and 43 serve for connecting the hinge 40 with the housing or further hinges, and for connection with the connection strut of the platform. To this end, the upper section 42 is provided with connection stubs 44, and the lower section 43 is provided with connection insertion openings 45.

The suspension according to the present invention, which includes articulation joints formed as tape hinges, has a simple construction and can be produced in a mass production process. The tape hinges can be produced as finished products and then assembled together to form a suspension. A particular advantage of the tape hinges consists in that they can be formed of a particular material, in particular, of a thermoplastic material or of a composite material, e.g., of a composition of different plastics or of a composite material formed of plastics and metal foil with desired characteristics. The assembly is significantly simplified due to the modular geometry of the tape hinges and particularly due to the use of simple connection elements. The articulation region is formed in advance and need not be formed only after the assembly of the suspension. As suitable materials for producing the tape or film hinges, polymer materials such as polyolefine, polypropylene, polyvinylchloride, or products of polycondensation such as polyamide, and/or their co-polymers particularly proved themselves.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A measuring device (6) subjected to gravitational forces and comprising at least one laterally oscillating, pendulously suspended, support structure (7) for supporting optical means; and means for suspending the support structure and including at least one hinge formed as a tape hinge (21; 40), wherein the suspension means comprises another tape hinge (22) connected in series with the at least one tape hinge (21) and an articulation region (23) of which is pivoted relative to an articulation region (23) of the at least one tape hinge (21) by 90°.

2. A measuring device according to claim 1, wherein the tape hinge (21; 40) is formed of one of a thermoplastic material and a compound material with rubber-like characteristics, and wherein the tape hinge (21; 40) has, in an articulation region (23; 41) thereof, a wall thickness (t) between about 5 μm and abut 400 μm, and a longitudinal extent of the articulation region (23; 41) is smaller than 3 mm.

3. A measuring device according to claim 2, wherein the tape hinge (21; 40) is formed of a plastic compound.

4. A measuring device according to claim 1, wherein the tape hinge (21) is provided with at least one of the conducting path and conducting wires (18) which serve for supplying power to at least one of devices provided on the pendulously suspended support structure and as signal lines.

5. A measuring device (6) subjected to gravitational forces and comprising at least one laterally oscillating, pendulously suspended, support structure (7) for supporting optical means; and means for suspending the support structure and including two tape hinges (21,22).

6. A measuring device (6) subjected to gravitational forces and comprising at least one laterally oscillating, pendulously suspended, support structure (7) for supporting at least one of measuring means and optical means; and means for suspending the support structure and including at least one hinge formed as a tape hinge (21; 40), wherein the suspension means comprises another tape hinge (22) connected in series with the at least one tape hinge (21) and an articulation region (23) of which is pivoted relative to an articulation region (23) of the at least one tape hinge (21) by 90°, wherein the measuring device is formed as a leveling device for a multi-axes laser indicator device emitting at least two mutually perpendicular laser beams, and wherein the measuring means supported on the support structure (7) comprises a laser light source (11) and an optical beam splitter (13).

* * * * *